US00RE47100E

(19) United States
(12) Reissued Patent
Smith et al.

(10) Patent Number: US RE47,100 E
(45) Date of Reissued Patent: Oct. 30, 2018

(54) MEDICAL DRESSING

(71) Applicant: Smith & Nephew PLC, London (GB)

(72) Inventors: Damian Smith, Hull (GB); Helene Lecomte, York (GB); Ella Mumby, Hull (GB)

(73) Assignee: Smith & Nephew PLC, London (GB)

(21) Appl. No.: 29/542,646

(22) Filed: Oct. 15, 2015

Related U.S. Patent Documents

Reissue of:
(64) Patent No.: Des. 691,730
Issued: Oct. 15, 2013
Appl. No.: 29/437,181
Filed: Nov. 14, 2012

(30) Foreign Application Priority Data

May 15, 2012 (EM) ..... 002041673-0001

(51) LOC (11) Cl. ..... 24-04
(52) U.S. Cl.
USPC ..... D24/189
(58) Field of Classification Search
USPC ..... D24/189
CPC ..... A61F 13/00; A61F 13/02; A61F 13/0203; A61F 13/0226
See application file for complete search history.

(56) References Cited

U.S. PATENT DOCUMENTS 2,233,209 A * 2/1941 Herzog ..... 602/58
2,280,506 A * 4/1942 Betts ..... 128/894
2,682,873 A 7/1954 Evans et al.
2,992,644 A * 7/1961 Plantinga et al. ..... 602/47
3,156,242 A * 11/1964 Crowe, Jr. ..... 128/96.1
3,204,277 A * 9/1965 Visman ..... A47L 17/00 15/145
3,301,429 A * 1/1967 McClain ..... A47G 19/2283 220/23.83
3,416,524 A * 12/1968 Meier ..... 602/47
D228,338 S * 9/1973 O'Neil et al. ..... D6/583
D281,794 S * 12/1985 Short ..... D21/489
4,649,909 A * 3/1987 Thompson ..... 602/42
5,176,663 A 1/1993 Svedman et al.
5,437,651 A 8/1995 Todd et al.
5,520,629 A * 5/1996 Heinecke et al. ..... 602/57
5,538,500 A 7/1996 Peterson
5,549,584 A 8/1996 Gross
D377,529 S * 1/1997 Nyqvist-Mayer ..... D24/189
5,636,643 A 6/1997 Argenta et al.
5,645,081 A 7/1997 Argenta et al.
D385,038 S * 10/1997 Shultz ..... D24/189
5,683,354 A * 11/1997 Levy ..... 602/54
5,704,905 A 1/1998 Jensen et al.
5,820,578 A 10/1998 Johansen
5,827,213 A 10/1998 Jensen
5,843,025 A 12/1998 Shaari
D408,541 S * 4/1999 Dunshee et al. ..... D24/189
D409,754 S * 5/1999 Dunshee et al. ..... D24/189
D419,273 S * 1/2000 France ..... D32/57
6,071,267 A 6/2000 Zamierowski
D430,674 S * 9/2000 Dunshee et al. ..... D24/189
D433,140 S * 10/2000 Nielsen ..... D24/189
6,142,982 A 11/2000 Hunt et al.
6,223,383 B1 * 5/2001 Vanputten ..... A47L 11/164 15/230
6,297,423 B1 10/2001 Schoenfeldt et al.
D452,121 S * 12/2001 Teichelman ..... D21/488
6,345,623 B1 2/2002 Heaton et al.
D454,955 S * 3/2002 Dunshee et al. ..... D24/189
D467,629 S * 12/2002 Manville ..... D21/496
D468,574 S * 1/2003 Moore ..... D6/613
6,506,175 B1 1/2003 Goldstein
D472,281 S * 3/2003 Manville ..... D21/488
D474,842 S * 5/2003 Wolsing et al. ..... D24/189
D480,144 S * 9/2003 Adams et al. ..... D24/189
6,613,953 B1 9/2003 Altura
6,648,862 B2 11/2003 Watson
D484,601 S * 12/2003 Griffiths et al. ..... D24/189
D484,602 S * 12/2003 Griffiths et al. ..... D24/189
6,685,681 B2 2/2004 Lockwood et al.
6,752,794 B2 6/2004 Lockwood et al.
D493,230 S * 7/2004 Liedtke et al. ..... D24/189
6,764,459 B1 7/2004 Donaldson
6,776,769 B2 8/2004 Smith
D501,926 S * 2/2005 Shaw et al. ..... D24/189
D503,982 S * 4/2005 Liedtke et al. ..... D24/189
6,936,037 B2 8/2005 Bubb et al.
D511,005 S * 10/2005 Liedtke et al. ..... D24/189
6,951,553 B2 10/2005 Bubb et al.
7,004,915 B2 2/2006 Boynton et al.
D516,729 S * 3/2006 Liedtke et al. ..... D24/189
7,049,478 B1 5/2006 Smith et al.

| | | | | |
|---|---|---|---|---|
| 7,108,683 | B2 | | 9/2006 | Zamierowski |
| 7,195,624 | B2 | | 3/2007 | Lockwood et al. |
| D556,823 | S | * | 12/2007 | Lombard ..... D19/1 |
| D557,424 | S | * | 12/2007 | Knight ..... D24/189 |
| D571,922 | S | | 6/2008 | Freeland |
| 7,381,859 | B2 | | 6/2008 | Hunt et al. |
| D572,367 | S | | 7/2008 | Freeland |
| D572,824 | S | | 7/2008 | Propp |
| D572,825 | S | | 7/2008 | Freeland |
| 7,438,705 | B2 | | 10/2008 | Karpowicz et al. |
| 7,569,742 | B2 | | 8/2009 | Haggstrom et al. |
| D600,354 | S | | 9/2009 | Toru |
| D604,424 | S | * | 11/2009 | Coubetergues ..... D24/189 |
| 7,615,036 | B2 | | 11/2009 | Joshi et al. |
| D605,299 | S | | 12/2009 | Iwahashi et al. |
| D607,112 | S | * | 12/2009 | Rogers ..... D24/189 |
| 7,645,269 | B2 | | 1/2010 | Zamierowski |
| D609,922 | S | | 2/2010 | Bridges et al. |
| D618,810 | S | | 6/2010 | Tanigawa et al. |
| D620,122 | S | | 7/2010 | Cotton |
| D620,123 | S | | 7/2010 | Igwebuike |
| 7,759,537 | B2 | | 7/2010 | Bishop et al. |
| 7,759,539 | B2 | | 7/2010 | Shaw et al. |
| 7,772,582 | B2 | | 8/2010 | Lina et al. |
| 7,776,028 | B2 | | 8/2010 | Miller et al. |
| 7,779,625 | B2 | | 8/2010 | Joshi et al. |
| 7,794,438 | B2 | | 9/2010 | Henley et al. |
| 7,794,468 | B2 | | 9/2010 | Henley et al. |
| D625,017 | S | | 10/2010 | Iwahashi et al. |
| 7,959,624 | B2 | | 6/2011 | Riesinger |
| 7,964,766 | B2 | | 6/2011 | Blott et al. |
| 7,976,519 | B2 | | 7/2011 | Bubb et al. |
| 8,080,702 | B2 | | 12/2011 | Blott et al. |
| 8,241,261 | B2 | | 8/2012 | Randolph et al. |
| D672,464 | S | * | 12/2012 | Holm et al. ..... D24/189 |
| D679,819 | S | | 4/2013 | Peron |
| D679,820 | S | | 4/2013 | Peron |
| 8,535,296 | B2 | | 9/2013 | Blott et al. |
| 8,540,699 | B2 | | 9/2013 | Miller et al. |
| D691,730 | S | | 10/2013 | Smith et al. |
| D692,565 | S | | 10/2013 | Lattimore et al. |
| D693,888 | S | * | 11/2013 | Webster ..... D21/490 |
| 8,715,256 | B2 | | 5/2014 | Greener |
| 8,764,732 | B2 | | 7/2014 | Hartwell |
| 8,791,316 | B2 | | 7/2014 | Greener |
| 8,795,247 | B2 | | 8/2014 | Bennett et al. |
| 8,808,274 | B2 | | 8/2014 | Hartwell |
| D712,547 | S | * | 9/2014 | Igwebuike ..... D24/189 |
| 8,843,327 | B2 | | 9/2014 | Vernon-Harcourt et al. |
| 8,916,742 | B2 | | 12/2014 | Smith |
| D722,699 | S | | 2/2015 | Riesinger |
| 9,061,095 | B2 | | 6/2015 | Adie et al. |
| 9,220,822 | B2 | | 12/2015 | Hartwell |
| 2003/0045825 | A1 | | 3/2003 | Etheredge, III |
| 2003/0139696 | A1 | | 7/2003 | Boukanov et al. |
| 2003/0212359 | A1 | | 11/2003 | Butler |
| 2004/0049146 | A1 | | 3/2004 | Kolte et al. |
| 2004/0162512 | A1 | | 8/2004 | Liedtke et al. |
| 2004/0167456 | A1 | | 8/2004 | Kingsford et al. |
| 2004/0241214 | A1 | | 12/2004 | Kirkwood et al. |
| 2006/0009744 | A1 | | 1/2006 | Erdman et al. |
| 2006/0122548 | A1 | | 6/2006 | Abrams |
| 2006/0206047 | A1 | | 9/2006 | Lampe et al. |
| 2007/0078467 | A1 | | 4/2007 | Mullen |
| 2008/0058692 | A1 | * | 3/2008 | Propp ..... A61F 13/0203 602/54 |
| 2008/0167593 | A1 | | 7/2008 | Fleischmann |
| 2009/0065014 | A1 | | 3/2009 | Nagata |
| 2009/0177135 | A1 | | 7/2009 | Rogers et al. |
| 2009/0227969 | A1 | | 9/2009 | Jaeb et al. |
| 2009/0240185 | A1 | | 9/2009 | Jaeb et al. |
| 2009/0281471 | A1 | | 11/2009 | Iwahashi et al. |
| 2009/0293887 | A1 | | 12/2009 | Wilkes et al. |
| 2009/0299340 | A1 | | 12/2009 | Kazala et al. |
| 2009/0299341 | A1 | | 12/2009 | Kazala et al. |
| 2009/0312728 | A1 | | 12/2009 | Randolph et al. |
| 2010/0069858 | A1 | | 3/2010 | Olson |
| 2010/0069863 | A1 | | 3/2010 | Olson |
| 2010/0069885 | A1 | | 3/2010 | Stevenson et al. |
| 2010/0106120 | A1 | | 4/2010 | Holm |
| 2010/0121286 | A1 | | 5/2010 | Locke et al. |
| 2010/0122417 | A1 | | 5/2010 | Vrzalik et al. |
| 2010/0125234 | A1 | | 5/2010 | Smith |
| 2010/0125258 | A1 | | 5/2010 | Coulthard et al. |
| 2010/0268198 | A1 | | 10/2010 | Buan et al. |
| 2010/0305490 | A1 | | 12/2010 | Coulthard et al. |
| 2010/0305526 | A1 | | 12/2010 | Robinson et al. |
| 2010/0305549 | A1 | | 12/2010 | Miller et al. |
| 2010/0324510 | A1 | | 12/2010 | Anderson et al. |
| 2011/0028918 | A1 | | 2/2011 | Hartwell |
| 2011/0052664 | A1 | | 3/2011 | Tennican et al. |
| 2011/0054421 | A1 | | 3/2011 | Hartwell |
| 2011/0092927 | A1 | | 4/2011 | Wilkes et al. |
| 2011/0106030 | A1 | | 5/2011 | Scholz |
| 2011/0112492 | A1 | | 5/2011 | Bharti et al. |
| 2011/0137222 | A1 | | 6/2011 | Masini |
| 2011/0172615 | A2 | | 7/2011 | Greener |
| 2011/0218509 | A1 | | 9/2011 | Dontas |
| 2011/0245788 | A1 | | 10/2011 | Marquez Canada |
| 2011/0282309 | A1 | | 11/2011 | Adie |
| 2012/0123311 | A1 | | 5/2012 | Weidemann-Hendrickson et al. |
| 2012/0172778 | A1 | | 7/2012 | Rastegar et al. |
| 2012/0232502 | A1 | | 9/2012 | Lowing |
| 2013/0310781 | A1 | | 11/2013 | Phillips et al. |
| 2015/0159066 | A1 | | 6/2015 | Hartwell et al. |

FOREIGN PATENT DOCUMENTS

| | | | |
|---|---|---|---|
| EP | 0 619 105 | A1 | 10/1994 |
| EP | 0619105 | A1 | 10/1994 |
| EP | 0 941 726 | | 9/1999 |
| EP | 2 098 257 | A1 | 9/2009 |
| EP | 2 335 749 | A1 | 6/2011 |
| EP | 2 366 721 | | 9/2011 |
| GB | 2 435 422 | | 8/2007 |
| WO | WO 95/14451 | | 6/1995 |
| WO | WO 97/11658 | | 4/1997 |
| WO | WO 99/01173 | | 1/1999 |
| WO | WO 99/01173 | A1 | 1/1999 |
| WO | WO 00/42957 | | 7/2000 |
| WO | WO 01/085248 | | 11/2001 |
| WO | WO 01/85248 | A1 | 11/2001 |
| WO | WO 02/17840 | | 3/2002 |
| WO | WO 02/26180 | | 4/2002 |
| WO | WO 09/019227 | | 2/2009 |
| WO | WO 09/019229 | | 2/2009 |
| WO | WO 2009/019227 | | 2/2009 |
| WO | WO 09/103031 | | 8/2009 |
| WO | WO 09/111657 | | 9/2009 |
| WO | WO 10/033574 | | 3/2010 |
| WO | WO 2010/033574 | A1 | 3/2010 |
| WO | WO 10/035017 | | 4/2010 |
| WO | WO 10/072395 | | 7/2010 |
| WO | WO 10/082872 | | 7/2010 |
| WO | WO 10/147533 | | 12/2010 |
| WO | WO 2010/147533 | A1 | 12/2010 |
| WO | WO 11/019476 | | 2/2011 |
| WO | WO 2011/019476 | A1 | 2/2011 |
| WO | WO 11/023275 | | 3/2011 |
| WO | WO 11/023650 | | 3/2011 |
| WO | WO 2011/023275 | A1 | 3/2011 |
| WO | WO 11/128651 | | 10/2011 |
| WO | WO 11/135284 | | 11/2011 |
| WO | WO 12/146656 | | 11/2012 |
| WO | WO 12/150235 | | 11/2012 |
| WO | WO 13/136181 | | 11/2013 |

OTHER PUBLICATIONS

KCI Licensing, Prevena™ Incision Management System, Jan. 2010.

U.S. Appl. No. 29/389,783, filed Apr. 15, 2011, Peron.

U.S. Appl. No. 13/092,042, filed Apr. 21, 2011, Adie.

Smith & Nephew, Allevyn Dressing Range, 2008.

Smith & Nephew, Allevyn Gentle Border Multisite, Jun. 2011.

KCI Licensing, Prevena™ Incision Management System Patient Guide, Jan. 2010.

KCI, Prevena™ Incision Management System Clinician Guide, Jan. 2010.
KCI Licensing, Prevena™ Incision Management System, 2010.

* cited by examiner

*Primary Examiner* — Philip S Hyder
(74) *Attorney, Agent, or Firm* — Knobbe, Martens, Olson & Bear, LLP

(57) CLAIM

The ornamental design for a medical dressing, as shown and described.

DESCRIPTION

*The present application is an application for reissue of U.S. Design Pat. No. D691,730, filed Nov. 14, 2012, which claims priority to Registered Community Design No. 002041673, filed May 15, 2012.*
FIG. 1 is a perspective view of a medical dressing.
FIG. 2 is a top view of the medical dressing of FIG. 1.
FIG. 3 is a bottom view of the medical dressing of FIG. 1.
FIG. 4 is a front view of the medical dressing of FIG. 1.
FIG. 5 is a rear view of the medical dressing of FIG. 1.
FIG. 6 is a right side view of the medical dressing of FIG. 1; and,
FIG. 7 is a left side view of the medical dressing of FIG. 1.
*FIG. 8 is a perspective view of another embodiment of a medical dressing.*
*FIG. 9 is a top view of the medical dressing of FIG. 8.*
*FIG. 10 is a bottom view of the medical dressing of FIG. 8.*
*FIG. 11 is a front view of the medical dressing of FIG. 8.*
*FIG. 12 is a rear view of the medical dressing of FIG. 8.*
*FIG. 13 is a right side view of the medical dressing of FIG. 8; and,*
*FIG. 14 is a left side view of the medical dressing of FIG. 8.*
*The broken lines shown in the drawings illustrate features that form no part of the claimed design.*

1 Claim, 14 Drawing Sheets

Figure 1:
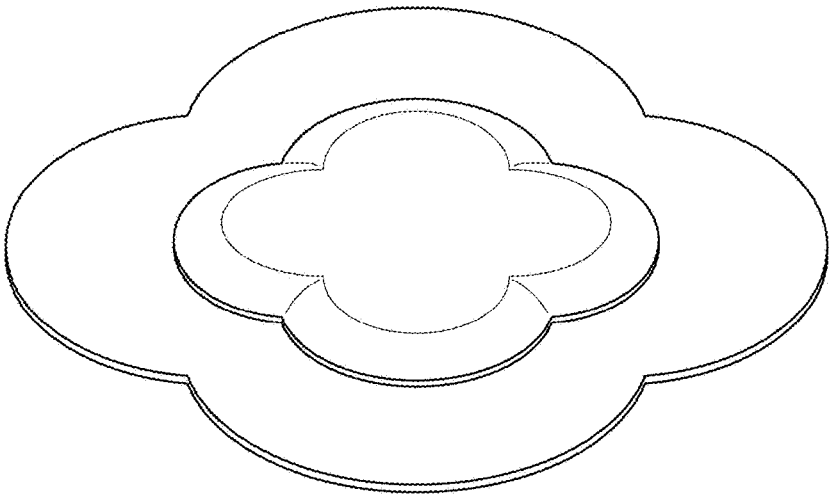
Figure 2:
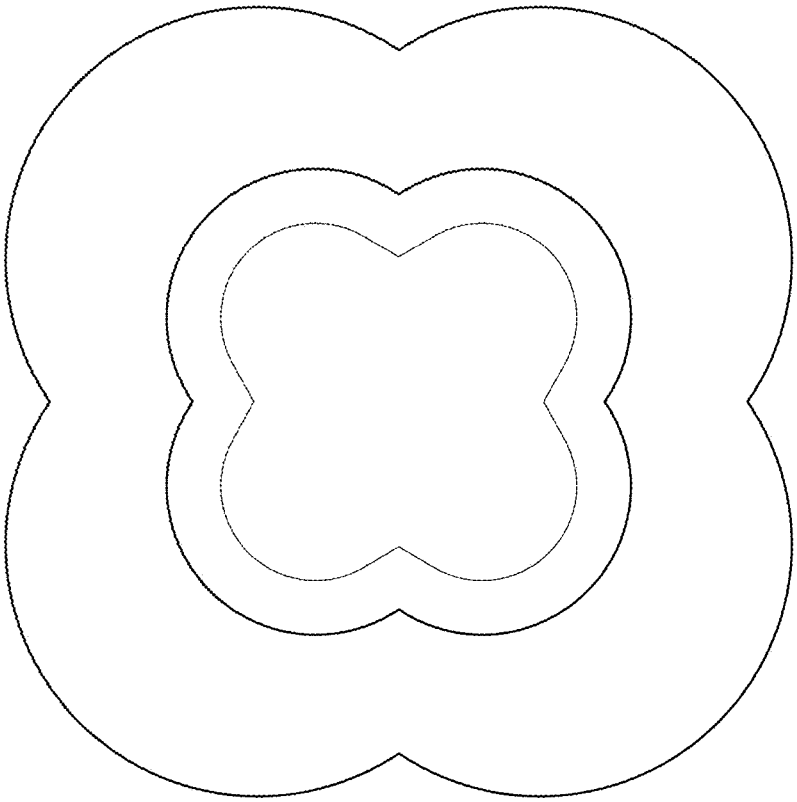
Figure 3:
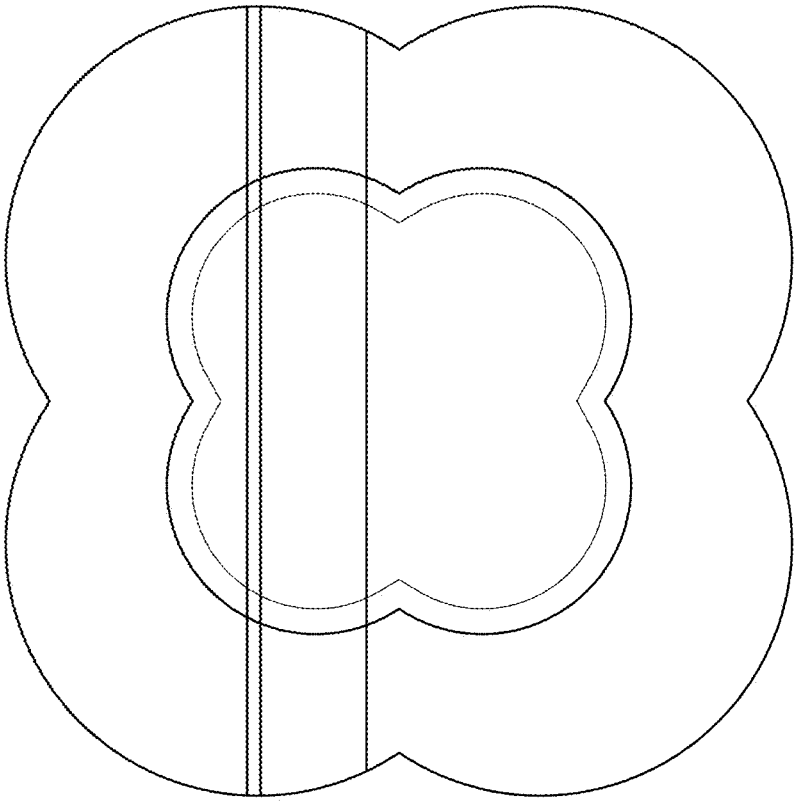
Figure 4:
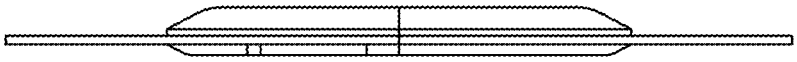
Figure 5:
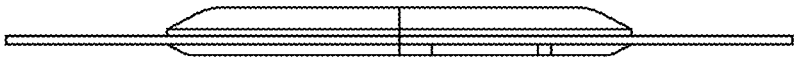
Figure 6:
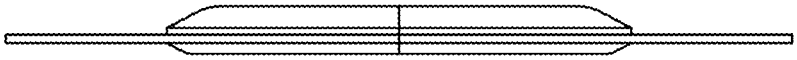
Figure 7:
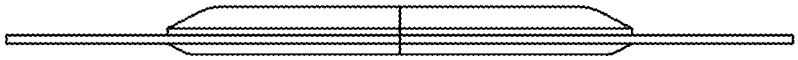

Matter enclosed in heavy brackets [ ] appears in the original patent but forms no part of this reissue; matter printed in italics indicates the additions made by reissue.

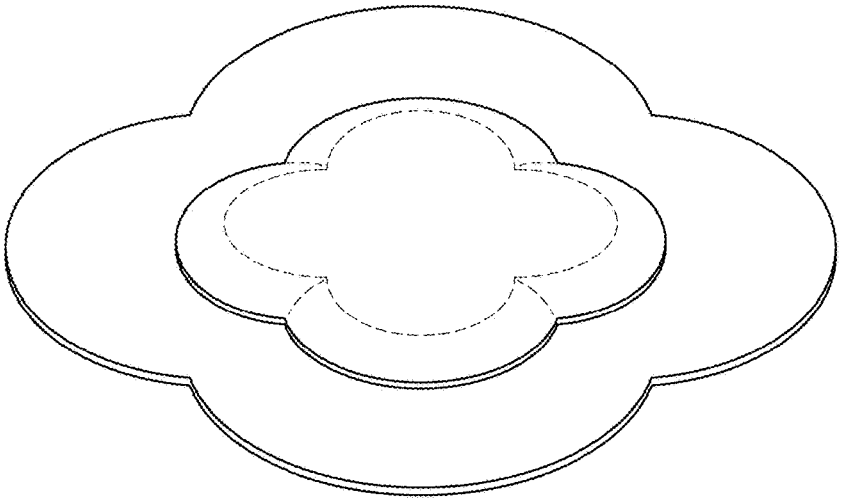
FIG. 8 (New)

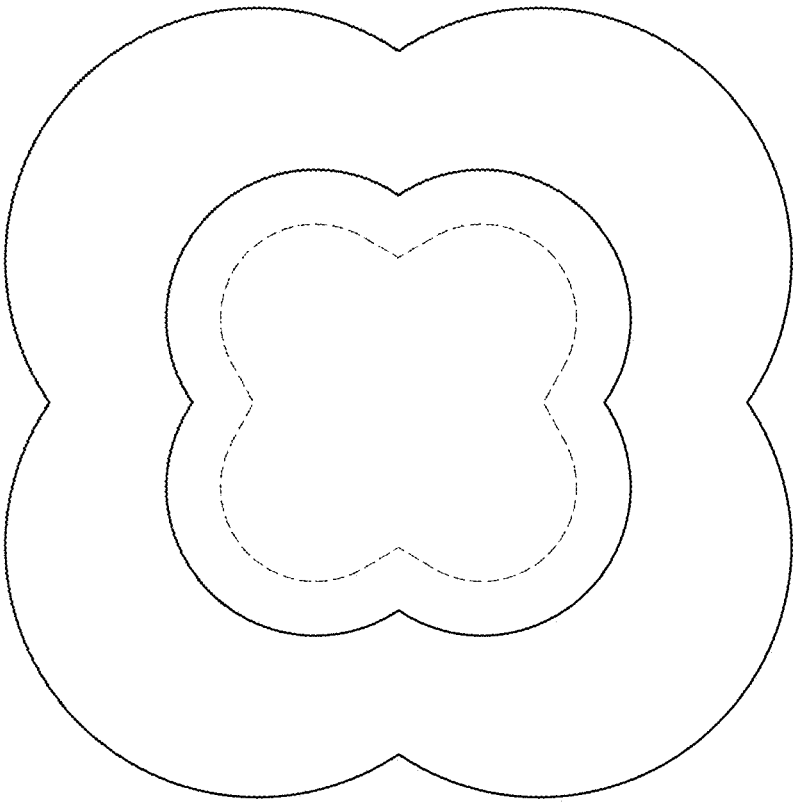
FIG. 9 (New)

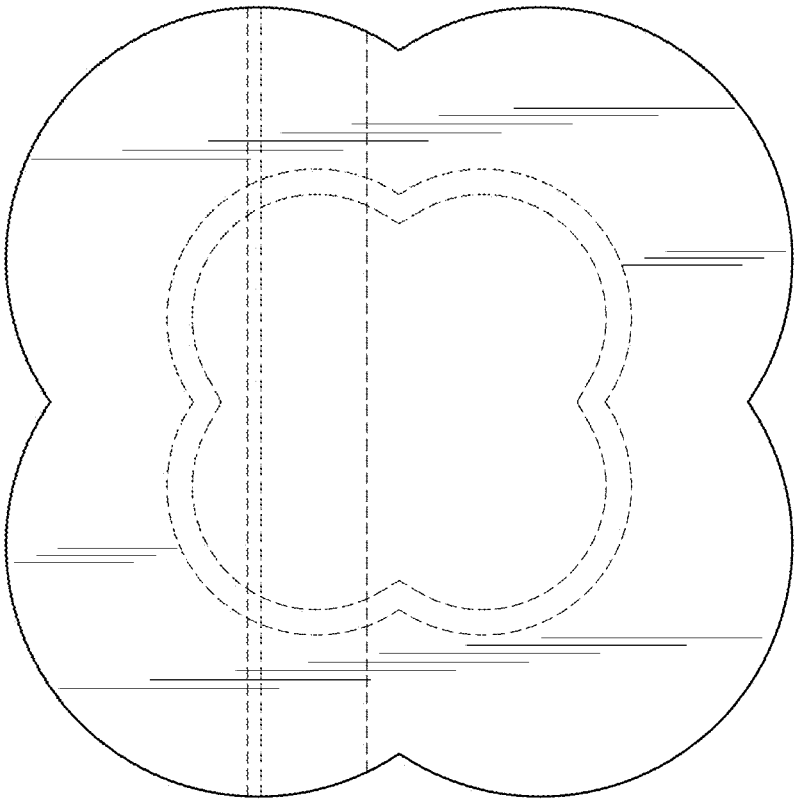
FIG. 10 (New)

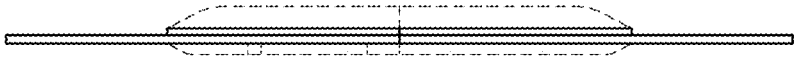
FIG. 11 (New)

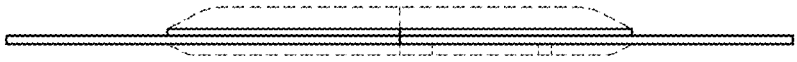
FIG. 12 (New)

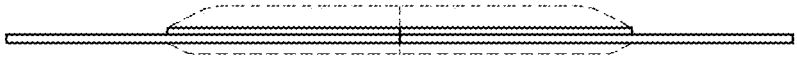
FIG. 13 (New)

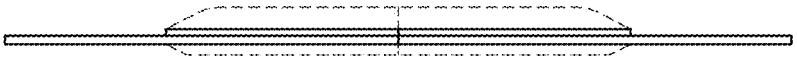
FIG. 14 (New)